United States Patent

Kalweit

[11] Patent Number: 5,872,312
[45] Date of Patent: *Feb. 16, 1999

[54] METHOD FOR RECOGNIZING DEFECTIVE IGNITION OR INJECTION SYSTEM IN INTERNAL COMBUSTION ENGINES

[75] Inventor: Dieter Kalweit, Schorndorf, Germany

[73] Assignee: Mercedes-Benz AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 680,418

[22] Filed: Jul. 15, 1996

Related U.S. Application Data

[63] Continuation of Ser. No. 680,418, Jul. 15, 1996, abandoned.

[30] Foreign Application Priority Data

Jul. 21, 1995 [DE] Germany ............... 195 26 644.7

[51] Int. Cl.$^6$ .................................................. G01M 15/00
[52] U.S. Cl. .......................... 73/118.1; 324/380; 324/399
[58] Field of Search .......................... 73/117.2, 117.3, 73/118.1; 123/638; 324/378, 380, 383, 384, 393, 399, 400; 340/438, 439; 701/29

[56] References Cited

U.S. PATENT DOCUMENTS

| | | | |
|---|---|---|---|
| 3,407,797 | 10/1968 | Ishibashi | 123/638 |
| 4,201,173 | 5/1980 | Okada et al. | 123/638 |
| 4,452,198 | 6/1984 | Berland | 123/638 |
| 4,871,970 | 10/1989 | Liebergesell | 324/380 |
| 4,920,944 | 5/1990 | Lanati et al. | 123/638 |

FOREIGN PATENT DOCUMENTS

| | | |
|---|---|---|
| 39 34 338 | 4/1991 | Germany . |
| 40 02 210 | 8/1991 | Germany . |
| 40 09 305 | 9/1991 | Germany . |
| 33 44 229 | 6/1995 | Germany . |
| WO 94/11627 | 5/1994 | WIPO . |

*Primary Examiner*—Ronald Biegel
*Assistant Examiner*—Eric S. McCall
*Attorney, Agent, or Firm*—Klaus J. Bach

[57] ABSTRACT

A method of detecting defective ignition or fuel injection system of an internal combustion engine with several cylinders and at least two spark plugs or two fuel injection devices per cylinder with separate control circuits, at least a second control circuit for the ignition or fuel injection systems is disabled so that all the spark plugs or injection devices of the at least second ignition or injection systems become inoperative, the engine running smoothness is then measured, the first system which was not disabled is identified as including the defective spark plug or injection device if the engine running smoothness was found to be affected, then the ignition or injection systems for any other spark plugs or injection devices are disabled cylinder-by-cylinder and the engine running smoothness is monitored to identify the cylinder which includes the defective spark plug or injection device.

4 Claims, 1 Drawing Sheet

METHOD FOR RECOGNIZING DEFECTIVE IGNITION OR INJECTION SYSTEM IN INTERNAL COMBUSTION ENGINES

This application is a continuation of application number Ser. No. 08/680,418, filed 15 Jul., 1996, now abandoned.

BACKGROUND OF THE INVENTION

The invention resides in a method for recognizing defective ignition systems of internal combustion engines with several cylinders wherein ignition misses are pin-pointed particularly on the basis of engine running smoothness in dependence on the ignition or injection timing of certain cylinders.

DE 40 02 210 A1 discloses such a method for engines which have only one spark plug per cylinder. Ignition misses are recognized with this method by monitoring the smoothness of the engine in as much as the angular speed of the crankshaft is measured. However, since the angular speed of the crankshaft is not only influenced by misses of the ignition system but also by forces which are transmitted from the road, via the wheels, to the drivetrain, other means are provided to make sure, without the use of expensive sensors, that admission of fuel to a faulty cylinder is discontinued as soon as possible, without making a wrong decision. The fuel supply should be discontinued because the catalytic converter could be destroyed by the unburned gases which would reach the catalytic converter if ignition misses would occur. Also, the combustion of the gases would be incomplete.

Another method and apparatus for monitoring the ignition system is described in DE 39 34 338 A1 and in DE 42 261 A1. In both cases, the angular speed variations of the crankshaft, that is, the smoothness of engine operation is used for determining misses since this method is still the most simple.

DE 40 09 305 A1 discloses an engine which has two spark plugs per cylinder for optimizing the combustion process. With such an engine, the methods for detecting ignition misses as described above can generally not be used. The torque changes generated by the failure of one of the spark plugs of a cylinder are too small; measuring the angular speed of the crankshaft will therefore not provide any useable error information. Measurements have shown that the torque loss upon failure of one of the spark plugs of a cylinder of a gasoline engine is only about 5%, a value which does not materially affect engine running smoothness, so that the monitoring of engine smoothness to determine ignition misses is not possible. The patent therefore proposes to provide, for each spark plug, special test arrangements so that failure of a spark plug can be determined and ignition can be switched over to the other spark plug. However, such test arrangements are quite involved and expensive.

Finally, for engines with fuel injection valves, it is known (DE 33 44 229 A1) to provide the injection valve with two magnetic systems for controlling the closing member wherein both magnetic systems are separately controlled. The closing member has coaxially disposed therein a second closing member for controlling a second injection opening so that the injection volume can be better controlled in accordance with the fuel requirements over the hole operating range of the engine.

It is the object of the present invention to provide a method for detecting fuel ignition misses of an engine which is usable with gasoline engines with two spark plugs per cylinder and also with Diesel engines with two injector nozzles per cylinder and which can be performed in a relatively inexpensive manner.

SUMMARY OF THE INVENTION

In a method of detecting defective ignition or fuel injection system of an internal combustion engine with several cylinders and at least two spark plugs or two fuel injection devices per cylinder with separate control circuits, at least a second control circuit for the ignition or fuel injection systems is disabled so that all the spark plugs or injection devices of the at least second ignition or injection systems become inoperative, the engine running smoothness is then measured, the first system which was not disabled is identified as including the defective spark plug or injection device if the engine running smoothness was found to be affected, then the ignition or injection systems for any other spark plugs or injection devices are disabled cylinder-by-cylinder and the engine running smoothness is monitored to identify the cylinder which includes the defective spark plug or injection device.

The spark plugs are disabled either cyclically or in a predetermined manner in order to achieve a complete malfunctioning of a cylinder like in engines which have only one spark plug per cylinder. Then the error information can be obtained by relatively simple measuring methods and it can be determined in which cylinder one of the two spark plugs or one of the two injection nozzles is inoperative.

With this procedure, it is possible to measure the angular speed of the crankshaft to determine the running smoothness of the engine and the fuel supply to a particular cylinder can then be cut when a particular cylinder has been found to include a defective spark plug or a defective injector.

An embodiment of the invention will be described in greater detail on the basis of the accompanying drawings.

DESCRIPTION OF A PREFERRED EMBODIMENT

Figure 1:
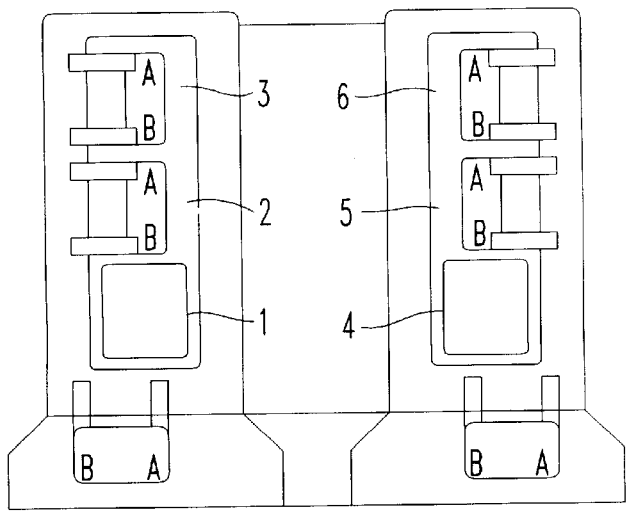
FIG. 1 is a schematic representation of a six cylinder gasoline engine wherein each cylinder has two spark plugs.

As shown in FIG. 1, the gasoline engine which is shown schematically has six cylinders designated by the reference numerals 1, 2, 3, 4, 5 and 6. Each of these cylinders has two spark plugs which can be energized independently from one another by way of parallel control circuits, such that they can fire even at different points in time. Therefore, to each cylinder 1–6, a spark plug (A) and a spark plug (B) is assigned which are both operative during normal engine operation.

If now, for example, the spark plug (B) of the cylinder 3 is defective, the combustion in the cylinder 3 is not as complete as it should be. Monitoring of the exhaust gas will therefore indicate that one of the twelve spark plugs of the engine of FIG. 1 is defective. Then, in accordance with FIG. 2, first an operating point for the test procedure is selected for example by means of a suitable software for the ignition control system, that is, a selection will be made of the cylinder for which the spark plugs should be disabled. This can be done for example, by temporarily disabling the ignition circuit for all spark plugs (A) or the ignition circuit for all spark plugs (B). This permits the determination whether the defective spark plug is an (A) or (B) spark plug by monitoring engine torque by way of determining the angular speed of the engine shaft as it is known in the art. But it is also possible to disable particular spark plugs successively at certain intervals in accordance with a given program, for example, 1% of the ignition occurrences of certain points of operation or stochastically in a certain range whose operating points will permit the recognition of a defective spark plug by determining smoothness of engine operation.

In any case, if as assumed earlier, the spark plug (B) of the cylinder 3 is defective and all the spark plugs (A) are disabled then there will be no combustion in cylinder 3 and it can then be determined in the known manner by monitoring engine smoothness which cylinder is inoperative since then no combustion takes place in cylinder 3. Since the engine operating smoothness suffered when spark plugs(A) were disabled, the spark plug (B) of the cylinder 3 is determined as being the defective spark plug. This information may then be recorded in an information storage to permit later replacement of the defective spark plug. In addition the ignition timing may be advanced for the cylinder 3 and the amount of fuel injected may be adjusted.

Figure 2:
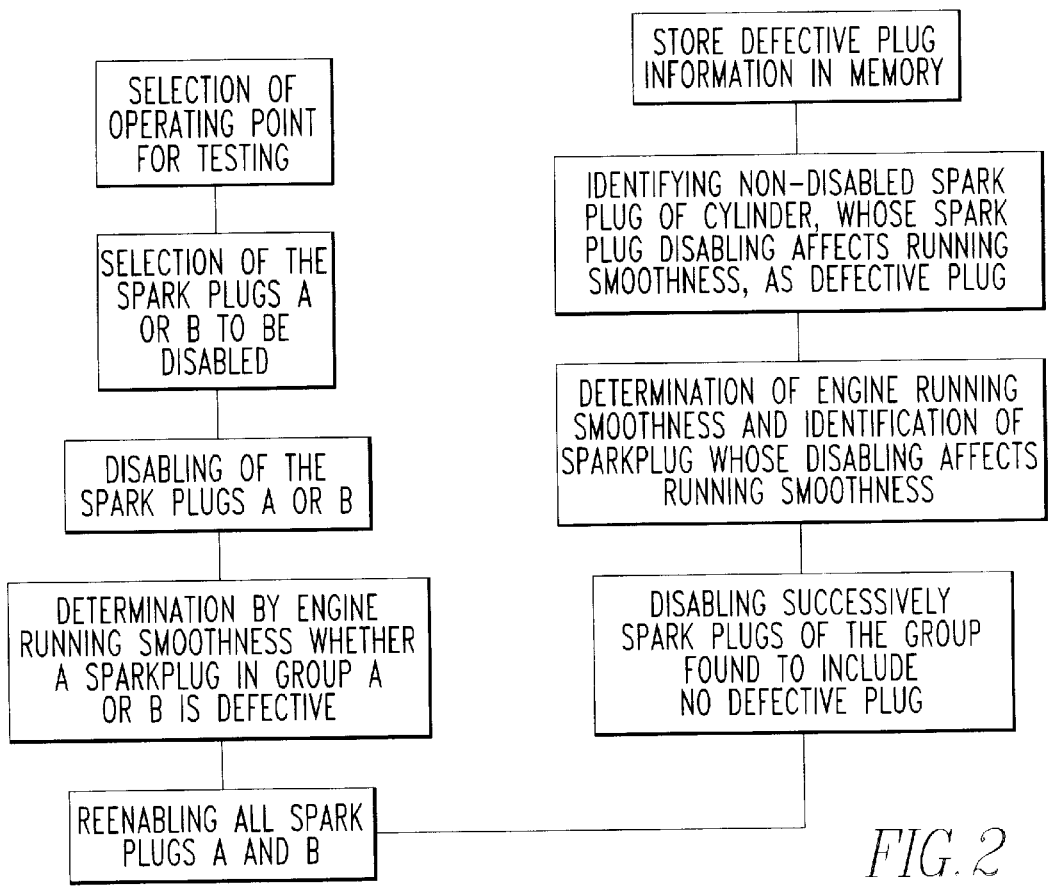
FIG. 2 is a flow block diagram showing the steps for detecting a cylinder with a defective spark plug for the engine shown in FIG. 1.

FIG. 2 shows the procedure for determining the defective spark plug: first, spark plugs (A) or (B) are temporarily disabled to determine whether a defective spark plug is part of the group (B) or (A) of spark plugs (top and left side of the diagram), then when it has been determined that the defective spark plug is part of one group, both groups of spark plugs are enabled again and one after the other of the spark plugs of the other group are disabled while engine running smoothness is monitored (right side of diagram of FIG. 2). In this manner, the defective spark plug can be singled out utilizing the simple engine smoothness monitoring means.

After the defective spark plug has been identified, this information is recorded in a memory so that the spark plug can he replaced during the next maintenance service. Meanwhile the ignition timing and/or the amount of fuel injected into the respective cylinder can be adjusted for continued efficient engine operation.

In the same manner in which a defective spark plug can be detected in an ignition system with two spark plugs per cylinder, a defective fuel injector can be detected in a fuel injection system with two fuel injectors per cylinder. Just substitute for the spark plugs A, B injectors A, B.

What is claimed is:

1. A method of detecting defective ignition systems of internal combustion engines with several cylinders and a first and a second spark plug per cylinder with separate ignition control circuits for said first and second spark plugs, said method comprising the steps of:

temporarily disabling cyclically successively said separate ignition control circuits for said first and said second spark plugs so that all said first or all said second spark plugs become inoperative, measuring the engine running smoothness, identifying the ignition control circuits not disabled as including the one with a defective spark plug if engine running smoothness is found to be sufficiently affected to indicate the missing of one of the cylinders of the engine, re-enabling the ignition control circuits, then successively disabling the ignition control circuits for the spark plugs of the other ignition circuits cylinder-by-cylinder, measuring the engine running smoothness and identifying the cylinder whose spark plug disabling disturbs engine running smoothness as including the defective spark plug.

2. A method according to claim 1, wherein the engine has a crankshaft rotating at varying angular speeds and engine running smoothness is determined by monitoring engine torque by way of determining the angular speed of the engine crankshaft.

3. A method according to claim 1, wherein information concerning the defective spark plug is recorded in a memory.

4. A method according to claim 1, wherein, after a cylinder with a defective spark plug has been identified, the ignition timing and/or amount of fuel injected is adjusted.

\* \* \* \* \*